Figure 1:
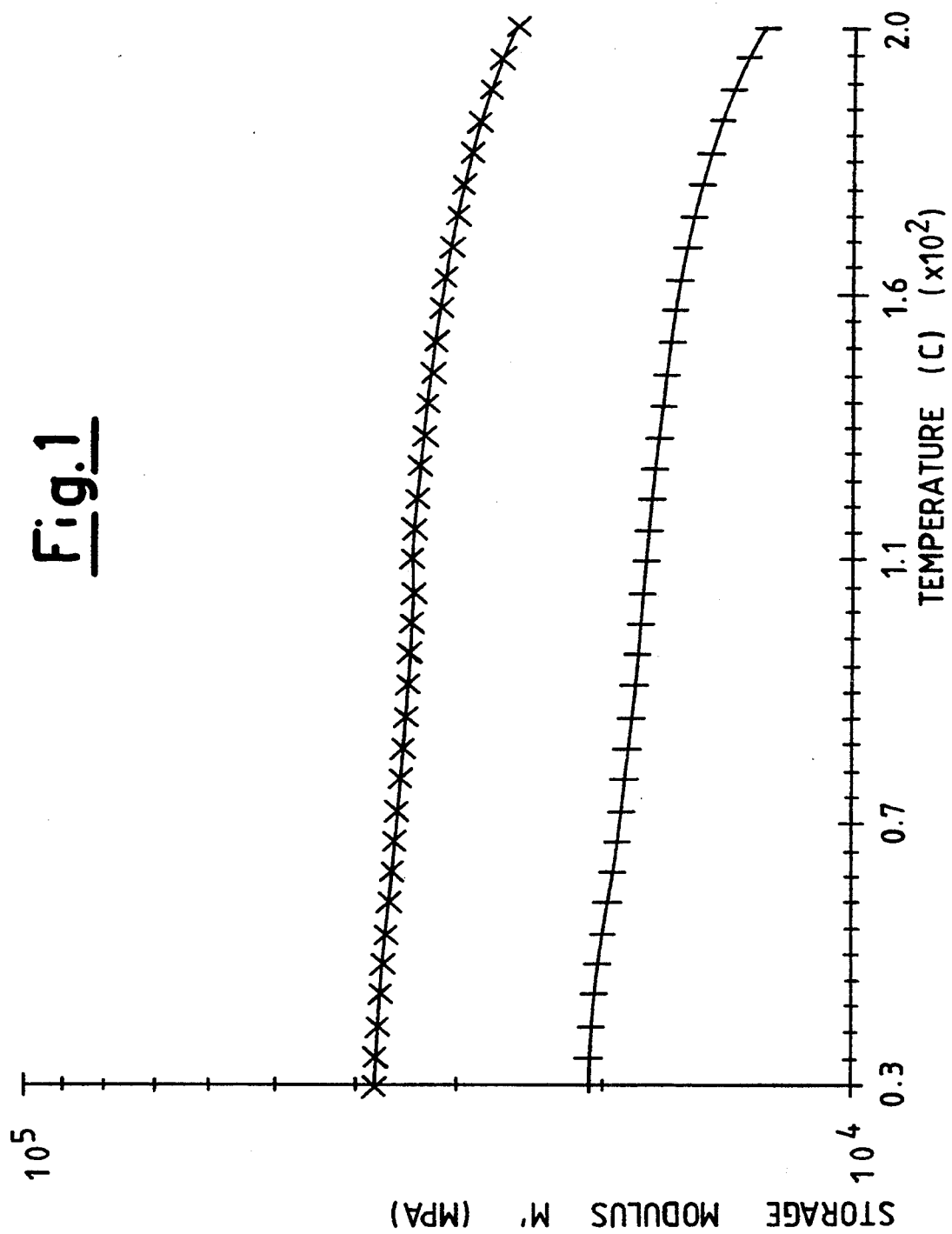

United States Patent [19]
Occhiello et al.

[11] Patent Number: 5,370,918
[45] Date of Patent: Dec. 6, 1994

[54] MIXED-MATRIX COMPOSITE MATERIAL REINFORCED WITH CONTINUOUS FIBRES

[75] Inventors: Ernesto Occhiello, Novara; Giorgio Giannotta, Milan; Anna Sommazzi, S. Margherita Ligure; Massimo Aratti; Fabio Garbassi, both of Novara, all of Italy

[73] Assignee: Enichem S.p.A., Milan, Italy

[21] Appl. No.: 100,577

[22] Filed: Jul. 30, 1993

[30] Foreign Application Priority Data

Jul. 31, 1992 [IT] Italy .................. MI 92-A/001892

[51] Int. Cl.$^5$ .......................................... B32B 1/04
[52] U.S. Cl. .................................. 428/74; 156/244.12;
264/136; 264/174; 428/283; 428/294; 428/373;
428/392; 428/402; 428/902
[58] Field of Search .............. 428/74, 283, 294, 373,
428/392, 402, 902; 156/244.12, 180; 264/136,
174

[56] References Cited

U.S. PATENT DOCUMENTS

| | | | |
|---|---|---|---|
| 3,742,106 | 6/1973 | Price | 264/131 |
| 4,614,678 | 9/1986 | Ganga | 428/74 |
| 4,699,579 | 10/1987 | Bourdon et al. | 264/174 |
| 5,310,871 | 5/1994 | Sommazzi et al. | 528/392 |

FOREIGN PATENT DOCUMENTS

0188939 7/1986 European Pat. Off. .
0391581 10/1990 Japan .

OTHER PUBLICATIONS

Ko, Chu, and Hua, "Damage Tolerance of Composites: 3-D Braided Commingled PEEK/Carbon", Journal of Applied Polymer.
Science: Applied Polymer Symposium 47, 501–519 (1991).
Encyclopedia of Composites, edited by S. M. Lee, published by VCH Publishers, New York, (1991).

*Primary Examiner*—James L. Bell
*Attorney, Agent, or Firm*—George P. Hoare, Jr.

[57] ABSTRACT

A mixed-matrix composite material reinforced with continuous fibre comprising a flexible sheath of thermoplastic polymer covering a multifibre filament impregnated with a powder consisting of:
- 50–99% by weight, and preferably 70–95%, of a thermoplastic polymer;
- 50–1% by weight, and preferably 30–5%, of a $C_2$–$C_4$ olefin/carbon monoxide alternating polymer having an intrinsic viscosity exceeding 0.1 dl/g when measured in m-cresol at 100° C.

9 Claims, 1 Drawing Sheet

MIXED-MATRIX COMPOSITE MATERIAL REINFORCED WITH CONTINUOUS FIBRES

This invention relates to a mixed-matrix composite material reinforced with continuous fibres.

More specifically, the invention relates to a continuous fibre-reinforced mixed-matrix composite material comprising a thermoplastic component and a component consisting of an olefin/carbon monoxide alternating polymer, and the method for its preparation.

Still more specifically, the invention relates to an essentially thermoplastic composite material consisting of rovings of continuous fibres of any type, whether mineral, organic or metal, impregnated with a powder comprising a thermoplastic component and a component based on an olefin/carbon monoxide alternating polymer, and covered with a thermoplastic outer sheath of the same type as or different type from the thermoplastic component of the powder.

For many applications, initially dominated by the use of metals, composite materials have been proposed consisting of a polymer matrix and an inorganic reinforcement, particularly glass or carbon fibres. For conditions in which their performance has necessarily to be high from the mechanical strength viewpoint, composites comprising long or in particular continuous fibre are proposed.

The first type of long or continuous fibre composite developed as an alternative to metals was characterised by a matrix consisting of thermosetting polymers, of which epoxy resins, unsaturated polyester resins and bismaleimides are characteristic examples. The methods for transforming this type of material were and still are preimpregnation and pultrusion.

With both these methods the fibres are passed through suitable solutions of the thermosetting material, leading to environmental problems and problems of process cost in view of the need to make provision for reusing and/or storing the solvents used.

To obviate such drawbacks, composite materials have recently been introduced which use thermoplastic polymers as the matrix. In this case the relative transformation requires the formation of a preliminary product if the composite is of the long or continuous fibre type.

An example of the preparation of such a preliminary product is reported in U.S. Pat. No. 3,742,106, which describes the formation of a composite by impregnating a continuous reinforcement filament in a molten thermoplastic material, or in U.S. Pat. No. 4,614,678 which describes the formation of a composite by impregnating a fibre roving with thermoplastic powder and covering the roving with a thermoplastic sheath.

A further example of a preliminary product for composites of thermoplastic matrix type is reported in the Journal of Applied Polymer Science—Applied Polymer Symposium, vol. 47, page 501, 1991, which describes the preparation of a continuous filament by extruding a mix consisting of reinforcement and thermoplastic fibres.

After preparing the preliminary product, the final piece is prepared by consolidation methods which can comprise heating and applying pressure, as reported for example at various points in the Encyclopedia of Composites, edited by S. M. Lee, published by VCH Publishers, New York. 1990–1991, or pultrusion of the preliminary product itself.

The use of thermoplastic composites has lead to undoubted improvements from the environmental viewpoint as solvents are not used in the production cycle. Certain thermal and mechanical problems are however observed, which are not present with thermosetting resins, in particular when low-cost matrices such as thermoplastic polyester resins are used, for example polyethyleneterephthalate or polybutyleneterephthalate, or polyamides such as polyamide-6. With these materials limited performance in terms of rigidity is observed, particularly at high temperature, making it difficult to design components from which a certain level of performance is required.

Attempts to combine the characteristics of thermoplastic matrix composites with the characteristics of thermosetting matrix composites are illustrated in the literature. Published European patent application 391,581 describes composites obtained by laminating thermoplastic matrix layers with thermosetting matrix layers. However this method has a considerable point of weakness linked to the consolidation and interface of layers of different mechanical characteristics.

The present applicant has now discovered a new continuous-fibre composite material of thermoplastic matrix which represents an improvement over traditional thermoplastic composite materials, particularly in terms of rigidity at low and high temperature, by being modified with an olefin/carbon monoxide alternating polymer. The present invention therefore provides a mixed-matrix composite material reinforced with continuous fibre comprising a flexible sheath of thermoplastic polymer covering a multifibre filament impregnated with a powder consisting of:

50–99% by weight, and preferably 70–95%, of a thermoplastic polymer;

50–1% by weight, and preferably 30–5%, of a $C_2$–$C_4$ olefin/carbon monoxide alternating polymer having an intrinsic viscosity exceeding 0.1 dl/g when measured in m-cresol at 100° C. More specifically, the present invention provides a mixed-matrix composite material reinforced with continuous fibre and prepared by a method comprising:

a) unwinding a continuous filament in the form of a fibre roving from a bobbin;

b) opening the filament essentially into its individual fibres;

c) bringing the opened filament into contact with a powder consisting of a thermoplastic polymer and a $C_2$–$C_4$ olefin/carbon monoxide alternating polymer having an intrinsic viscosity exceeding 0.1 dl/g when measured in m-cresol at 100° C.

d) reassembling the filament and arranging about it a flexible protective sheath of thermoplastic polymer.

The composite material of the present invention has high flexibility, enabling it to be woven to form highly flexible matting or be used as such to form articles of any shape or size by the filament winding method. The composite obtained in this manner can have a fibre content of up to 90% by volume, and preferably between 40 and 60%.

Any type of filament can be used to prepare the composite of the present invention. Typical examples are glass fibres with a count of between 150 and 2500 tex, Kevlar aramide fibres with a count of between 1000 and 2000 decitex, and carbon fibres with a count of between $3 \times 10^3$ and $12 \times 10^3$ filaments.

The filament can be opened by a system comprising at least two rollers, one of which drives. Having opened the roving, the filament is brought into contact with the powder.

The powder particle size is not critical in forming the composite of the present invention. The only critical aspect can be the thickness or diameter of the individual constituent fibres of the filament.

In this respect, as the impregnation of the filament with the powder is achieved by the particles accumulating about each fibre, it is preferable for said particles to have an average size approximately equal to or less than the thickness of each individual fibre. Generally the average diameter of the individual particles is between 10 and 150 micrometres. The opened filament can be impregnated with the powder by dragging the opened filament through the powder, which is maintained in a fluidized state by inert gases as described in U.S. Pat. No. 4,614,678.

Any thermoplastic polymer having a moulding temperature of less than 300° C., and preferably less than 280° C. or less than 260° C. can be used to prepare the composite of the present invention. Examples include: polyolefins such as low, medium or high density polyethylene, polypropylene, polystyrene, copolymers of ethylene with propylene and/or butenes, ethylene-vinylacetate copolymers, halogenated polyolefins such as polyvinylchloride, styrene copolymers (ABS, SAN etc.), aliphatic polyesters such as polyethyleneterephthalate, polybutyleneterephthalate and relative copolymers, polycarbonates, polyacrylates and/or polymethacrylates and relative copolymers, Pa-6, Pa-6,6, Pa-4,6, Pa-11 and Pa-12 polyamides etc. and their mixtures.

The $C_2$-$C_4$ olefin/carbon monoxide alternating polymers are essentially copolymers and/or terpolymers having an intrinsic viscosity generally of between 0.5 and 5 dl/g. Ethylene/CO copolymers and ethylene/propylene/CO terpolymers are preferred. The $C_2$-$C_4$ olefin/carbon monoxide alternating polymers are known in the literature and can be prepared by the process described in Italian patent application 2969/MI91A.

More specifically, said alternating polymers can be prepared by reacting at least one $C_2$-$C_4$ olefin with carbon monoxide in an olefin/CO molar ratio of between 10:1 and 1:5. The reaction temperature is between 20° and 200° C. and the pressure between 40 and 100 bar.

The following polymerization catalyst is used:
a product of general formula:

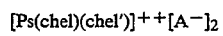

$$[Ps(chel)(chel')]^{++}[A^-]_2$$

where chel and chel', which can be the same or different, represent a nitrogenated or phosphorated bidentate chelating agent and $A^-$ an anion of an acid with pKa less than 6;
and possibly an organic oxidant.

The preferred catalyst is that in which $A^-$ represents hexafluorophosphate, chel represents 1,10-phenanthroline (phen) and chel' 2,2'-bipyridyl (bipy), p-benzoquinone being used as the organic oxidant.

When the opened filament has been impregnated it is reassembled and covered with a thermoplastic sheath such that the weight ratio of impregnating powder to sheath is between 1:2 and 2:1.

The constituent material of the sheath is chosen from the previously listed thermoplastic polymers and can be of the same type as or different type from that of the component thermoplastic component of the powder. Sheaths of polymers which are not only different from but have higher or lower melting points than the constituent polymers of the thermoplastic component of the powder can also be used.

The sheath is arranged about the continuous filament by known methods, for example by extrusion, as described in published European patent applications Nos. 188,939 and 190,522. The composite material of the present invention has high flexibility, enabling it to be woven to form highly flexible matting or be used as such to form articles of any shape or size by the filament winding method.

More particularly, the composite material of the present invention is suitable for use as an alternative to metals and metal alloys in the building, transport, aerospace and other industries.

The following examples are provided by way of non-limiting illustration to enable the present invention to be better understood and implemented.

In the subsequent examples reference is made to an ethylene/propylene/CO terpolymer prepared in the following manner. 500 ml of methanol are fed into a pressure vessel of 2 litres capacity. 0.5 Moles of $[Pd(phen)(bipy)]^{++}[PF_6^-]_2$ catalyst, 40 mmoles of p-benzoquinone and 100 g of propylene are added. An ethylene/CO (50/50 w/w) mixture is then fed in to a pressure of about 58 atm.

After about 5 hours of reaction at 70° C., the pressure vessel is cooled to ambient temperature and the pressure released. The terpolymer obtained in this manner is filtered off, washed with methanol and dried at ambient temperature. 140 g of polymer were obtained having an intrinsic viscosity of 1.5 dl/g.

The $[Pd(phen)(bipy)]^{++}[PF_6^-]_2$ catalyst was prepared by suspending 300 mg of $[Pd(phen)(CF_3COO)_2]$ in 13 ml of methanol. 110 mg of 2,2'-bipyridyl (Pd:bipy=1:1.2) are added to the yellow suspension obtained. The suspension colour becomes orange, and after a few minutes all the solid dissolves to give an orange solution. A solution of $NH_4PF_6$ in methanol (0.19 g of $NH_4PF_6$ dissolved in 3 ml of methanol; Pd:$PF_6$=1:2) is then added dropwise.

Immediately after adding the initial drops a yellow solid precipitates which, when the addition is complete, is left stirring at ambient temperature for 30 minutes. It is then filtered off using a pump, washed with methanol and dried under vacuum (yield 82%).

EXAMPLES 1-4

A 320 tex glass filament type OCF R28 of Owens Corning Fiberglass is impregnated with a powder formed from polybutyleneterephthalate (PBT) type PIBITER N100 of ECP Enichem Polimeri, Milan with a particle size of 60 micrometres, and the previously described ethylene/propylene/CO terpolymer with a particle size of 120 micrometres.

The filament is impregnated with the powder maintained in a fluidized bed state by the method described in U.S. Pat. No. 4,614,678.

After impregnation, a sheath formed from the same polymer as the thermoplastic component of the powder is applied to the filament. The impregnating powder:sheath weight ratio is 1:1.

The sheath is applied to the filament by a Maillefer 30 extruder fitted with a die of the type used for sleeving. The die diameter is 3.5 mm; the mandrel diameter is 2.9 mm; the filament guide diameter is 1.5 mm; the die inlet diameter is 2.4 mm. The die temperature is maintained at 250° C. with a filament feed rate of 40 m/min.

Further characteristics of the composite material are given in Table 1.

Test pieces for mechanical and dynamic-mechanical characterisation were prepared from the composite filament prepared in this manner. The filament was wound manually about a rectangular plate, taking care to fill the space as regularly as possible.

The plate was then partially welded to facilitate its handling, after which it was cut in a direction perpendicular to the filament to obtain sample units of dimensions 20×20 cm. Plates were prepared by stacking 6 sample units on each other, in one case unidirectionally and in another case as a 0-90-0-0-90-0 arrangement. The plates were then compression moulded under the following conditions:

T 250° C.; P 16 bar; Time 20 minutes.

The final plates were cut by the water jet method to obtain the test pieces for the mechanical and dynamic-mechanical tests. The dynamic-mechanical experiments were carried out using a Dynastat instrument operating at a frequency of 1 Hz. Test pieces of dimensions 60×12×3 mm were used with a three-point flexural geometry (41 mm span between supports). The temperature gradient was 1° C./min.

FIG. 1 shows the final results. For the samples obtained from mixed-matrix composites (X Example 1) a greater rigidity is apparent throughout the entire temperature range investigated compared with the sample obtained from a composite with only a thermoplastic matrix (+Example 4).

Mechanical bending tests were carried out at 23° C. using a model 312.31 MTS frame, with a span/thickness ratio of 40, in accordance with ASTM D790M. The breaking load is defined as that load at which initial damage to the test piece occurs, as determined by the appearance of a discontinuity in the load-deformation curve. The plates obtained with unidirectional fibres were firstly characterised. Table 2 shows the results obtained. It will be noted that even at low terpolymer contents there is an evident improvement in the composite characteristics (modulus and breaking load), In the case of samples moulded with alternated stratification the results are shown in Table 3.

TABLE 1

| Example | Fibre Type | Fibre vol % (1) | TP Resin Type | Terpolymer wt % (2) |
|---|---|---|---|---|
| 1 | glass | 52 | PBT | 10 |
| 2 | glass | 52 | PBT | 30 |
| 3 | glass | 57 | PBT | 50 |
| 4 (comparison) | glass | 40 | PBT | — |

(1) On the total composite
(2) On the powder alone

TABLE 2

| Sample | M | C | A |
|---|---|---|---|
| Example 1 | 42.6 | 825 | 2.4 |
| Example 2 | 39.0 | 705 | 2.0 |
| Example 3 | 38.3 | 646 | 1.8 |
| Example 4 (comparison) | 28.0 | 578 | 2.2 |

M = flexural elastic modulus (GPa)
C = breaking load (MPa)
A = deformation at breakage (%)

TABLE 3

| Sample | M | C | A |
|---|---|---|---|
| Example 1 | 28.5 | 493 | 1.7 |
| Example 2 | 27.3 | 420 | 1.6 |
| Example 3 | 31.0 | 412 | 1.4 |
| Example 4 (comparison) | 22.3 | 437 | 2.0 |

We claim:

1. A mixed-matrix composite material reinforced with continuous fibre comprising a flexible sheath of thermoplastic polymer covering a multifibre filament impregnated with a powder consisting of:
   50–99% by weight of a thermoplastic polymer;
   50–1% by weight of a $C_2$–$C_4$ olefin/carbon monoxide alternating polymer having an intrinsic viscosity exceeding 0.1 dl/g when measured in m-cresol at 100° C.

2. A composite material as claimed in claim 1, prepared by a method comprising:
   a) unwinding a continuous filament in the form of a fibre roving from a bobbin;
   b) opening the filament essentially into its individual fibres;
   c) bringing the opened filament into contact with a powder consisting of a thermoplastic polymer and a $C_2$–$C_4$ olefin/carbon monoxide alternating polymer having an intrinsic viscosity exceeding 0.1 dl/g when measured in m-cresol at 100° C.;
   d) reassembling the filament and arranging about it a flexible protective sheath of thermoplastic polymer.

3. A composite material as claimed in claim 1, wherein the fibre content is up to 90 vol %.

4. A composite material as claimed in claim 2, wherein the filament is opened by a system comprising at least two rollers, of which at least one drives.

5. A composite material as claimed in claim 1, wherein the average diameter of the individual constituent particles of the powder is between 10 and 150 micrometres.

6. A composite material as claimed in claim 2, wherein the opened filament is impregnated with the powder by dragging the opened filament through the powder, which is maintained in a fluidized state by inert gases.

7. A composite material as claimed in claim 1, wherein the $C_2$–$C_4$ olefin/carbon monoxide alternating polymers are essentially copolymers and/or terpolymers having an intrinsic viscosity generally of between 0.5 and 5 dl/g.

8. A composite material as claimed in claim 1, wherein the thermoplastic sheath is such that the weight ratio of the impregnating powder to the sheath is between 1:2 and 2:1.

9. A method for preparing the composite material in accordance with claim 1, comprising:
   impregnating a multifibre filament with a powder consisting of a thermoplastic polymer and a $C_2$–$C_4$ olefin/carbon monoxide alternating polymer having an intrinsic viscosity exceeding 0.1 dl/g when measured in m-cresol at 100° C.;
   applying to the filament treated in this manner a flexible sheath of thermoplastic polymer.

* * * * *